July 27, 1937. F. I. DU PONT 2,088,190
METHOD AND APPARATUS FOR EXTRACTING SULPHUR FROM SULPHUR BEARING MATERIAL
Filed Aug. 12, 1935
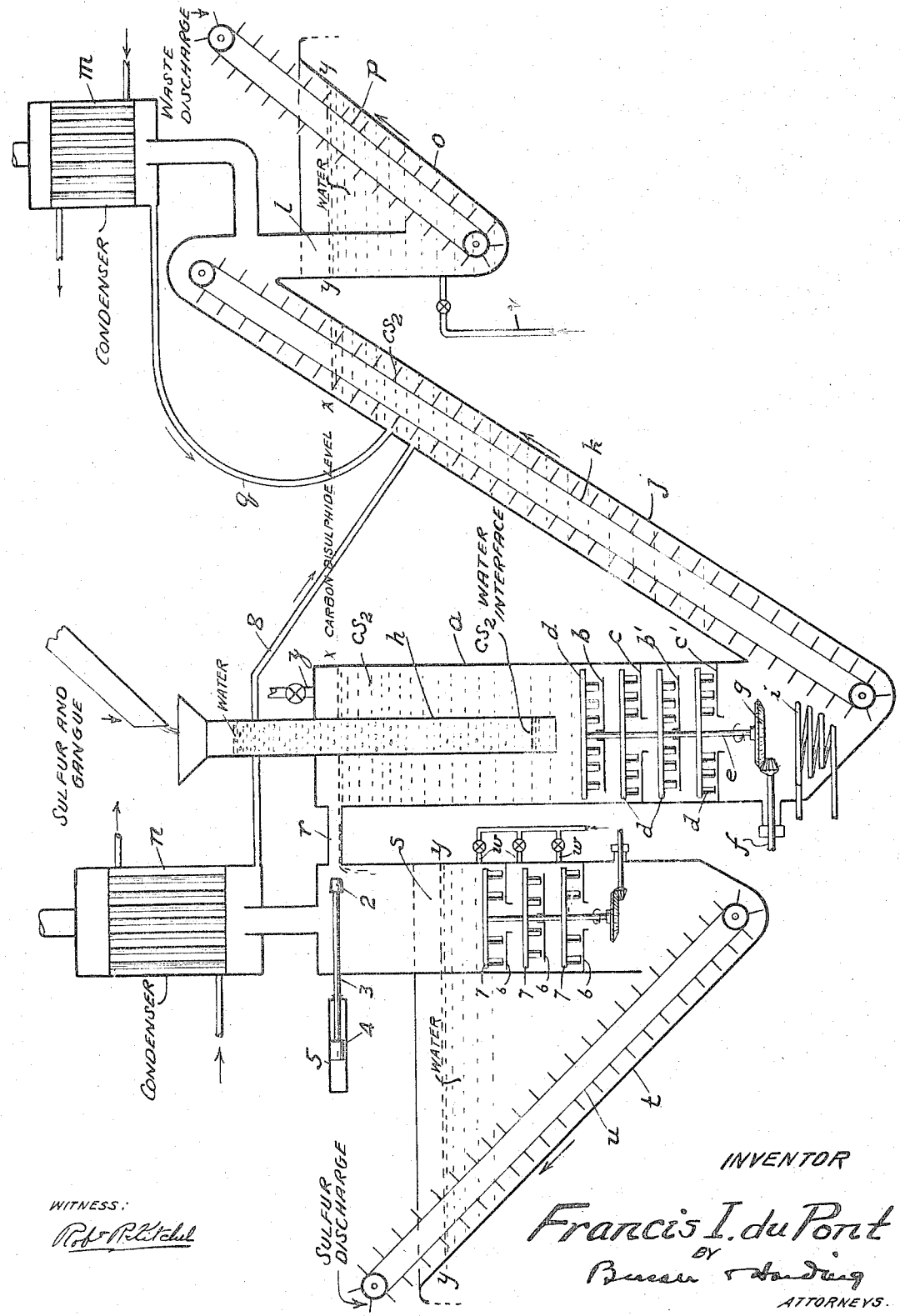
INVENTOR
Francis I. du Pont
BY
ATTORNEYS.

UNITED STATES PATENT OFFICE 2,088,190

METHOD AND APPARATUS FOR EXTRACTING SULPHUR FROM SULPHUR-BEARING MATERIAL

Francis I. du Pont, Wilmington, Del., assignor to Delaware Chemical Engineering Corporation, Wilmington, Del., a corporation of Delaware Application August 12, 1935, Serial No. 35,833

17 Claims. (Cl. 23—228)

This invention relates to a method and apparatus for extracting sulphur from sulphur bearing material.

The method and apparatus in accordance with this invention will find application generally to the extraction of sulphur from sulphur bearing ores and other sulphur bearing materials and will also be applicable for the separation of sulphur in mechanical admixture with other materials such, for example, as the waste product from illuminating gas purifying apparatus, which comprises a mechanical mixture of sulphur and iron oxide in the form of a fine powder.

Generally speaking, the method in accordance with this invention will involve the extraction of sulphur from sulphur bearing material, or dissolving of sulphur in admixture with another material, by means of a body of carbon disulphide, discharge of the extracted material and sulphur solution from the body, recovery of carbon disulphide from the extracted material and return to the body, by evaporation through the medium of heated water and condensation, and separation of the extracted sulphur from the discharged sulphur solution and return of the carbon disulphide to the body by evaporation of the carbon disulphide through the medium of heated water and condensation.

Generally speaking, the apparatus will comprise a container for carbon disulphide, means for charging sulphur bearing material thereinto through a water seal, and means for discharging extracted material and sulphur solution therefrom, respectively, into bodies of heated water for the evaporation of carbon disulphide and which also act as water seals to seal the discharges from the apparatus. Condensers are provided for the condensation of vaporized carbon disulphide and are connected for return of the condensed carbon disulphide to the container.

Having now indicated in a general way the nature and purpose of my invention, I will proceed to a detailed description of a preferred form of apparatus in accordance therewith and from the description of which and of the operation thereof preferred procedure in accordance with the method will be understood.

In the drawing the single figure comprises a diagrammatic showing of a preferred form of apparatus embodying this invention and adapted for carrying out the method thereof.

Referring to the drawing $a$ indicates a container, which may be of any form, but desirably will be a cylinder of considerable height relative to its diameter. Within the lower part of container $a$ a series of fixed plates or trays are arranged in vertically spaced relation and alternately arranged for passage of material downwardly in the tower adjacent their circumference and adjacent their center. Thus, the plates $b$ and $b'$ are spaced peripherally from the wall of the container providing an annular opening for the passage of material, while the plates $c$ and $c'$ are centrally apertured providing a central passage for material.

Associated with the plates $b$, $b'$ and $c$, $c'$ are revoluble rakes $d$, respectively mounted on a vertical shaft $e$, driven from a suitably driven shaft $f$, through gearing $g$. The teeth of the rakes associated with plates $b$ and $b'$ are slanted so as to move material on these plates toward the periphery thereof for discharge therefrom, while the teeth of the rakes associated with the plates $c$ and $c'$ are oppositely slanted so as to move material on these plates toward the center thereof for discharge therefrom.

Extending downwardly into the container $a$ is a charging tube $h$ and positioned adjacent to the bottom of the container is a steam coil $i$ adapted to receive steam from any suitable source and to discharge to waste.

The bottom of the container $a$ is of generally conical form and leading therefrom in an upwardly inclined direction is a discharging passage $j$ in which operates an endless conveyor $k$, for the discharge of solid material from the container $a$. The passage $j$ communicates at its upper end with a chamber $l$ in communication at its upper end with a condenser $m$ and in communication at its lower end with a vessel $o$. A valved steam line $v$ leads into the vessel $o$ adjacent the point of communication with the chamber $l$. The vessel $o$ is formed with a slanting side on which runs an endless conveyor $p$ for the discharge of solid material from the vessel. From the condenser $m$ a conduit $q$, adapted to carry condensate leads to the discharge passage $j$ at a point substantially below its upper end.

Adjacent the top of the container is a liquid overflow conduit $r$, for the discharge of liquid from the container, and which leads into a chamber $s$ in communication at its upper end with a condenser $n$ and in communication at its lower end with a vessel $t$. Plates 6 and scrapers 7 in association therewith similar to the plates $b$, $b'$ and $c$, $c'$, and rakes $d$ provided in container $a$ are provided in chamber $s$ below the water level therein. From the condenser $n$ a conduit 8 adapted to carry condensate leads to discharge passage $j$, at a point substantially below its upper end. A series of valved steam lines, $w$, $w$ lead into chamber $s$ at vertically spaced points. The vessel $t$ is formed with a slanting side on which runs an endless conveyor $u$ for discharge of solid material from the vessel.

A scraper 2 carried on a rod 3 connected with a piston 4 adapted to be reciprocated, by the application of, for example, steam, in a cylinder 5 is provided in alignment with passage $r$. By reciprocation of the piston 4 the scraper will be reciprocated through passage $r$ for the removal of any sulphur which may be deposited therein.

The condensers $m$ and $n$ are open to the atmosphere opposite to the points of communication therewith of chambers $l$ and $s$, respectively.

In the operation of the apparatus above described, for carrying out the method in accordance with this invention, for example, for effecting the separation of sulphur as present in mechanical mixture with iron oxide in waste product from illuminating gas purifying apparatus, the container $a$ and the discharge passage $j$ will be filled with liquid carbon disulphide to the level indicated by the line $x$, $x$. The carbon disulphide may be introduced into the container $a$ from any suitable source through the valved pipe $z$. The charging tube $h$ will be filled with water, which, since it is lighter than carbon disulphide, will not pass into the container $a$ nor admix with the carbon disulphide therein.

In charging the container $a$ with carbon disulphide and the charging tube $h$ with water, the tube $h$ will desirably be filled with water when the level of the carbon disulphide in the container $a$ closes the bottom of the charging tube and the level of the carbon disulphide then brought up to the level indicated by the lines $x$, $x$.

The vessels $o$ and $t$ will be charged with water to the levels indicated by the lines $y$, $y$, so that the water will rise into chambers $l$ and $s$, and steam will be introduced into the vessels to heat the water therein. At the same time, steam will be introduced into the steam coil $i$ to heat the carbon-disulphide in container $a$. The rakes $d$ will be set in rotation.

Waste product from illuminating gas purifying apparatus comprising a mixture of sulphur and iron oxide in finely divided form, and usually containing about 30% sulphur, will now be introduced into the charging tube $h$. The mixture will pass down through the water in the charging tube $h$ into the container $a$ in which it will fall on the top plate $b$. The introduction of the mixture will be continuous. By operation of the rake associated with the plate $b$, the mixture will be agitated and stirred about in the carbon disulphide and will be worked outwardly and over the peripheral edge of the plate, over which it will fall upon the plate $c$. The rake associated with plate $c$ will stir and agitate the mixture in the carbon disulphide and will work the mixture inwardly towards the center aperture of the plate, through which the mixture will pass downwardly to plate $b'$ where the operation of the rake associated with the plate will be similar to that of the rake associated with the plate $b$. The mixture passing over the peripheral edge of plate $b'$ will fall down upon plate $c$, from which, by operation of the rake associated with that plate, it will be caused to pass through the center aperture of the plate to fall into the bottom of the container.

In the passage of the mixture over the plates $b$, $b'$ and $c$, $c'$, the sulphur content of the mixture will be dissolved in carbon disulphide, and the upper portion of the container will contain a solution of sulphur and carbon disulphide.

The material falling from plate $c'$ will comprise oxide freed from sulphur. This material will be carried up the discharge passage $j$ by the conveyor $k$. It will be noted that the iron oxide will be carried by the conveyor above the level of the carbon disulphide in the discharge passage and will be given an opportunity to drain. The conveyor will ultimately discharge the iron oxide, which will be wet with carbon disulphide, into closed chamber $l$, in which it will fall into the hot water contained in the lower part thereof. The water will be at a temperature such as to volatilize the carbon disulphide carried by the iron oxide. The volatilized carbon disulphide will pass from the chamber $l$ into condenser $m$, in which it will be condensed and from which it will flow back into discharge passage $j$ through conduit $q$, which communicates with the discharge passage $j$ at a point below the level of carbon disulphide therein.

The iron oxide freed from carbon disulphide will be discharged from the bottom of chamber $l$ through vessel $o$ by means of the conveyor $p$.

With the continued addition of a mixture of sulphur and iron oxide in a finely divided state through the charging tube $h$, overflow of carbon disulphide carrying sulphur in solution from container $a$ will occur through the overflow conduit $r$. The solution overflowing through the conduit $r$ will pass into closed chamber $s$ and will fall into the hot water contained therein. The water contained in the chamber $s$ is maintained, by virtue of the introduction of steam through lines $w$, $w$ at a temperature such as to volatilize the carbon disulphide from the solution, resulting in deposit of the sulphur in solid form on the plates 6 from which respectively it is discharged, by the rakes 7 associated therewith, to fall to the bottom of the chamber, from which it is removed through vessel $t$ by means of conveyor $u$. The volatilized carbon disulphide passes to condenser $m$ and the condensed carbon disulphide is returned to the container $a$ through conduit 8 which enters the discharge passage $j$ below the level of carbon disulphide therein.

Should the outlet conduit $r$ become clogged up by the deposit of the sulphur in solid form therein, it may be readily cleared by operation of the scraper 2, as, for example, by reciprocation of the piston 4, under the influence of any suitable fluid medium, as steam.

It will be appreciated that the procedure above described, involving the use of the apparatus above described, may be applied to any sulphur-bearing material or mixture of sulphur with other material from which it is desired to recover the sulphur.

It will be further appreciated that various modifications in detail may be made in the apparatus above described and in the procedure above described without departing from the scope of this invention.

What I claim and desire to protect by Letters Patent is:

1. The method of separating sulphur from associated material which includes dissolving sulphur from associated material through the medium of carbon disulphide and discharging the solution into a body of water maintained at a temperature to effect volatilization of the carbon disulphide.

2. The method of separating sulphur from associated material which includes dissolving sulphur from associated material by means of carbon disulphide, discharging the solution into a body of water maintained at a temperature to effect volatilization of the carbon disulphide and condensing the volatilized carbon disulphide.

3. The method of separating sulphur from associated material which includes introducing sulphur and associated material into a body of carbon disulphide, discharging from the body of carbon disulphide sulphur in solution in carbon disulphide into a body of water maintained at a temperature to effect volatilization of the carbon disulphide and recovering the precipitated sulphur.

4. The method of separating sulphur from associated material which includes introducing sulphur and associated material into a body of carbon disulphide, and separately discharging from the body of carbon disulphide sulphur in solution in carbon disulphide and associated material, the solution being discharged into a body of water maintained at a temperature to effect volatilization of the carbon disulphide.

5. The method of separating sulphur from associated material which includes introducing sulphur and associated material into a body of carbon disulphide, discharging from the body of carbon disulphide sulphur in solution in carbon disulphide, into a body of water maintained at a temperature to effect the volatilization of the carbon disulphide, condensing volatilized carbon disulphide and returning it to said body of carbon disulphide.

6. The method of separating sulphur from associated material which includes introducing sulphur and associated material into a body of carbon disulphide, discharging the associated material substantially free from sulphur from said body into water at a temperature to effect volatilization of carbon disulphide carried thereby, condensing volatilized carbon disulphide and returning it to the body thereof, discharging carbon disulphide carrying sulphur in solution from said body into water at a temperature to effect volatilization of the carbon disulphide, and condensing volatilized carbon disulphide and returning it to the body of carbon disulphide.

7. The method of separating sulphur from associated material which includes introducing sulphur and associated material into a body of carbon disulphide, discharging the associated material substantially free from sulphur from said body into water at a temperature to effect volatilization of carbon disulphide carried thereby, discharging the associated material from the water, condensing volatilized carbon disulphide and returning it to the body thereof, discharging carbon disulphide carrying sulphur in solution from said body into water at a temperature to effect volatilization of the carbon disulphide, discharging sulphur from the water, condensing volatilized carbon disulphide and returning it to the body of carbon disulphide.

8. The method of separating sulphur from associated material which includes introducing sulphur and associated material into a body of carbon disulphide through a water seal, discharging sulphur in solution in carbon disulphide from said body into a water seal at a temperature such as to volatilize the carbon disulphide removing precipitated sulphur from said water seal, and discharging associated material from said body through a water seal at a temperature at which carbon disulphide carried thereby will be volatilized.

9. The method of separating sulphur from associated material which includes introducing sulphur and associated material into a body of carbon disulphide through a water seal, discharging sulphur in solution in carbon disulphide from said body into a water seal at a temperature such as to volatilize the carbon disulphide, removing precipated sulphur from said water seal, discharging associated material from said body through a water seal at a temperature at which carbon disulphide carried thereby will be volatilized, condensing volatilized carbon disulphide and returning it to said body.

10. The method of separating sulphur from associated material which includes introducing sulphur and associated material into a body of carbon disulphide through a water seal, discharging sulphur in solution in carbon disulphide from said body into a water seal at a temperature such as to volatilize the carbon disulphide, removing precipitated sulphur from said water seal, condensing volatilized carbon disulphide and returning it to said body.

11. The method of separating sulphur from associated material which includes continuously introducing sulphur and associated material into a body of carbon disulphide through a water seal, continuously discharging sulphur in solution in carbon disulphide from said body into a water seal at a temperature such as to volatilize the carbon disulphide, continuously removing precipitated sulphur from said water seal, continuously discharging associated material from said body through a water seal at a temperature at which carbon disulphide carried thereby will be volatilized and continuously condensing volatilized carbon disulphide and returning it to said body.

12. Apparatus for separating sulphur from associated material which includes a container, means for maintaining a body of carbon disulphide in said container, means including a water seal for the introduction of sulphur and associated material into said container, means including a water seal for discharging associated material from said container, means including a water seal for discharging sulphur from said container and means for heating said last two mentioned water seals to a temperature such as to effect volatilization of any carbon disulphide passing therethrough.

13. Apparatus for separating sulphur from associated material which includes a container, means for maintaining a body of carbon disulphide in said container, means including a water seal for the introduction of sulphur and associated material into said container, means including a water seal for discharging associated material from said container, means including a water seal for discharging sulphur from said container, means for heating said last two mentioned water seals to a temperature such as to effect volatilization of any carbon disulphide passing therethrough and means for condensing volatilized carbon disulphide and returning to said body of carbon disulphide.

14. Apparatus for separating sulphur from associated material which includes a container, means for maintaining a body of liquid carbon disulphide in said container, means forming a water seal for the introduction of sulphur and associated material into said container, a discharge passage for sulphur dissolved in carbon disulphide leading from said container, a body of water, a condenser, a chamber in communication with said discharge passage and said condenser and in communication with said body of water below the surface thereof, means to heat said body of water to a temperature such as to volatilize carbon disulphide carried by said associated material and means for return of condensed carbon disulphide to said container.

15. Apparatus for separating sulphur from associated material which includes a container, means for maintaining a body of liquid carbon disulphide in said container, means forming a water seal for the introduction of sulphur and associated material into said container, a discharge passage for associated material leading from the bottom of said container, a body of water, a condenser, a chamber in communication with said discharge passage and said condenser and in communication with said body of water below the surface thereof, means to heat said body of water to a temperature such as to volatilize carbon disulphide carried by said associated material and means for return of condensed carbon disulphide to said container.

16. Apparatus for separating sulphur from associated material which includes a container, means for maintaining a body of liquid carbon disulphide in said container, means forming a water seal for the introduction of sulphur and associated material into said container, means for the discharge of associated material from the container, means for the discharge of sulphur in solution in carbon disulphide from the container, bodies of water arranged, respectively, to receive associated material and solution discharged from the container, means for heating the bodies of water to a temperature at which carbon disulphide will be volatilized and means for condensing volatilized carbon disulphide and returning the condensate to the body of liquid carbon disulphide.

17. Apparatus for separating sulphur from associated material which includes a container, means for maintaining a body of liquid carbon disulphide in said container, means forming a water seal for the introduction of sulphur and associated material into said container, means for the discharge of associated material from the container, means for the discharge of sulphur in solution in carbon disulphide from the container, bodies of water arranged, respectively, to receive associated material and solution discharged from the container, means for heating the bodies of water to a temperature at which carbon disulphide will be volatilized, means for condensing volatilized carbon disulphide and returning the condensate to the body of liquid carbon disulphide and means for discharging sulphur and associated material from the bodies of water, respectively.

FRANCIS I. DU PONT.